United States Patent

Comeau, II

[11] Patent Number: 5,901,564
[45] Date of Patent: May 11, 1999

[54] SYSTEM FOR GERMICIDAL DISINFECTING OF FOOD INSIDE OF REFRIGERATORS USING ULTRAVIOLET RADIATION

[76] Inventor: Richard J. Comeau, II, 7636 Country Rd. 621, Cape Girardeau, Mo. 63701

[21] Appl. No.: 08/986,833

[22] Filed: Dec. 8, 1997

[51] Int. Cl.⁶ ..................................................... F25D 23/00
[52] U.S. Cl. ................................................. 62/264; 62/78
[58] Field of Search ........................................ 62/264, 78

[56] References Cited

U.S. PATENT DOCUMENTS 3,377,941   4/1968   Jaremus ...................................... 62/264
5,184,471   2/1993   Losacco et al. ........................... 62/264

*Primary Examiner*—Ronald Capossela
*Attorney, Agent, or Firm*—Polster, Lieder, Woodruff & Lucchesi, L.C.

[57] ABSTRACT

A device for disinfecting food stored in a refrigerated compartment, utilizing radiation emitted in the ultraviolet wavelengths between 200 and 300 nanometers emitted by a lamp. The lamp is installed on an upper surface of an enclosed refrigerator compartment lined with a reflective lining adapted to reflect radiation in the ultraviolet wavelengths. A raised grill is provided within the enclosed compartment for the placement of food products for disinfecting above a lower surface of the compartment, permitting reflected ultraviolet radiation to impact the underside of the food products. A switch triggered by the opening and closing of a door on the refrigerator, and a timer activated by the switch, activate the ultraviolet lamp after a predetermined period has elapsed from closure of the refrigerator door. The timer is further configured to switch off the ultraviolet lamp after the food placed in the compartment has been exposed to the emitted ultraviolet radiation for a period of time sufficient to destroy any contaminating microorganism. A display panel positioned on the exterior surface of the refrigerator is configured to provide an operator with a means to control the operation of the ultraviolet lamp and an indication of both the operating status of the ultraviolet light and of the environmental conditions within the refrigerated compartment.

17 Claims, 3 Drawing Sheets

SYSTEM FOR GERMICIDAL DISINFECTING OF FOOD INSIDE OF REFRIGERATORS USING ULTRAVIOLET RADIATION

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to a device and method for disinfecting stored food, and more particularly, to an ultraviolet light source for disinfecting food stored in a refrigerator.

Contamination of a food supply by bacteria and other micro-organisms is a problem which has always affected mankind. Today, with the advent of mass handling and shipping of food products worldwide, the problem is more prevalent than ever. Current United States Food and Drug Administration (USFDA) estimates are that one third of the entire United States population each year will become ill due to ingestion of a food born bacteria. These numbers are appalling in a technologically advanced world that is coming into the 21st century.

Ultraviolet (UV) light has long been known for over 150 years to have germicidal properties capable of destroying bacteria, mold, yeast and viruses. UV light was one of the earliest utilized methods of disinfecting. However, its use has been discontinued because of the advent of chlorinating and ozonation disinfecting methods. The strategic advantage of UV light over these methods is that it presents an excellent alternative to chemical treatments without the concerns of toxic chemical byproducts.

Ultraviolet light having germicidal properties is centered about a wavelength of 253.7 nanometers on the electromagnetic spectrum, below the UV wavelengths responsible for suntanning, and above the X-ray portion of the spectrum. These germicidal wavelengths are emitted by the sun, but are filtered out by the Earth's ozone layer before reaching the surface.

Ultraviolet light treatment is unique in its mode of action in that it does not kill the target organism. Instead the UV light alters the target organism's cell DNA so that the target organism is sterilized. This serves to inactivate the target organism so that it cannot proliferate and cause disease. Ultraviolet light has the additional advantage of adding nothing to the exposed foods, an is easily absorbed by both solids and liquids. Effective sterilization is achieved by simply exposing the food products to the a high-energy ultraviolet light source.

A lamp emitting ultraviolet light is quite similar to a standard florescent tube lamp shown at 10 in FIG. 1 which has been used as an efficient light source for many years. The standard florescent tube 10 shown in FIG. 1 comprises an outer tube of glass 12 which is transparent to light in the visible spectrum 14, and coated on an inner surface with phosphor 16. When electrical current is supplied to the florescent lamp 10 through connectors 18a and 18b, the flow of current through a cathode element 20 triggers initiates a flow of electrons 22 towards an oppositely disposed anode element (not shown). Disposed within the glass tube 12 are mercury atoms 24, which when struck by a flowing electron 22, emit ultraviolet radiation as at 26. Interaction between the ultraviolet radiation 26 and the phosphor coating 16 on the glass tube 12 produces light in the visible spectrum which passes through the glass tube 12. The main difference between the florescent tube lamp of FIG. 1 and an ultraviolet tube lamp is the lack of a phosphor coating on the inner surface of the ultraviolet tube lamp, and the use of a special type of glass to which is transparent to ultraviolet light frequencies emitted by the mercury atoms.

BRIEF SUMMARY OF THE INVENTION

Among the several objects and advantages of the present invention are:

The provision of an a device for disinfecting stored food with ultraviolet light;

The provision of the aforementioned food disinfecting device adapted for use in a refrigerator storage compartment;

The provision of the aforementioned food disinfecting device configured to irradiate stored food with ultraviolet light for a predetermined period of time upon closure of the refrigerator door;

The provision of the aforementioned food disinfecting device configured to simultaneously irradiate both upper and lower surfaces of stored food with ultraviolet light;

The provision of the aforementioned food disinfecting device configured with a visible display means indicating operation of the device; and The provision of the aforementioned food disinfecting device which is simple to install and manufacture, and which facilitates sanitary food storage practices.

Briefly stated, the present invention is a device for disinfecting food stored in a refrigerated compartment, utilizing radiation emitted in the ultraviolet wavelengths. The device comprises a lamp configured to emit ultraviolet radiation having wavelengths between 200 and 300 nanometers installed on an upper surface of an enclosed refrigerator compartment. The compartment is lined with a reflective lining adapted to reflect radiation in the ultraviolet wavelengths. A raised grill is provided within the enclosed compartment for the placement of food products for disinfecting above a lower surface of the compartment, permitting reflected ultraviolet radiation to impact the underside of the food products. A switch triggered by the opening and closing of a door on the refrigerator, and a timer activated by the switch are configured to activate the ultraviolet lamp a predetermined period of time after closure of the refrigerator door. The timer is further configured to switch off the ultraviolet lamp after the food placed in the compartment has been exposed to the emitted ultraviolet radiation for a period of time sufficient to destroy any contaminating microorganism. A display panel positioned on the exterior surface of the refrigerator is configured to provide an operator with a means to control the operation of the ultraviolet lamp and an indication of both the operating status of the ultraviolet light and of the environmental conditions within the refrigerated compartment.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

Figure 2:
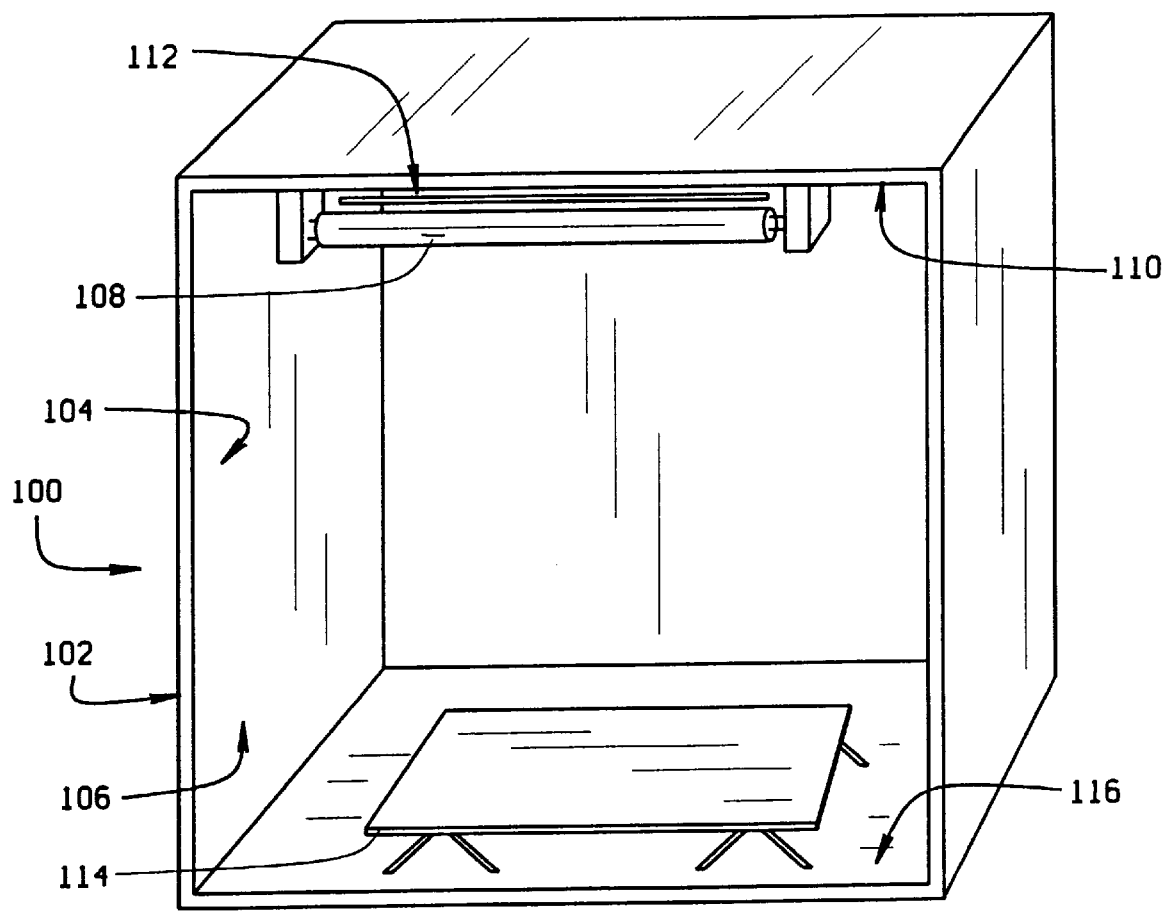
FIG. 2 is a cut-away perspective illustration of an enclosed food disinfecting compartment, illustrating the placement of the ultraviolet radiation source and food storage grill.

Turning to FIG. 2, a preferred embodiment of the food storage and disinfecting unit of the present invention is shown generally at 100. The unit comprises an enclosed refrigerator compartment 102, having an inner surface 104 fully lined with a reflective lining 106. As is readily understood, one surface of the compartment includes a door (not shown) for access to the interior. An ultraviolet lamp 108, configured to emit ultraviolet radiation of germicidal wavelengths between 200 and 300 nanometers is secured an upper surface 110 of the enclosed compartment 102 by conventional fastener means (not shown). A reflective cover 112 secured above the ultraviolet lamp 108 is positioned to focus any ultraviolet radiation emitted from the lamp 108 in an upward direction back downward. A raised grill 114 is installed on the lower surface 116 of the enclosed compartment 102.

Figures 1, 3:
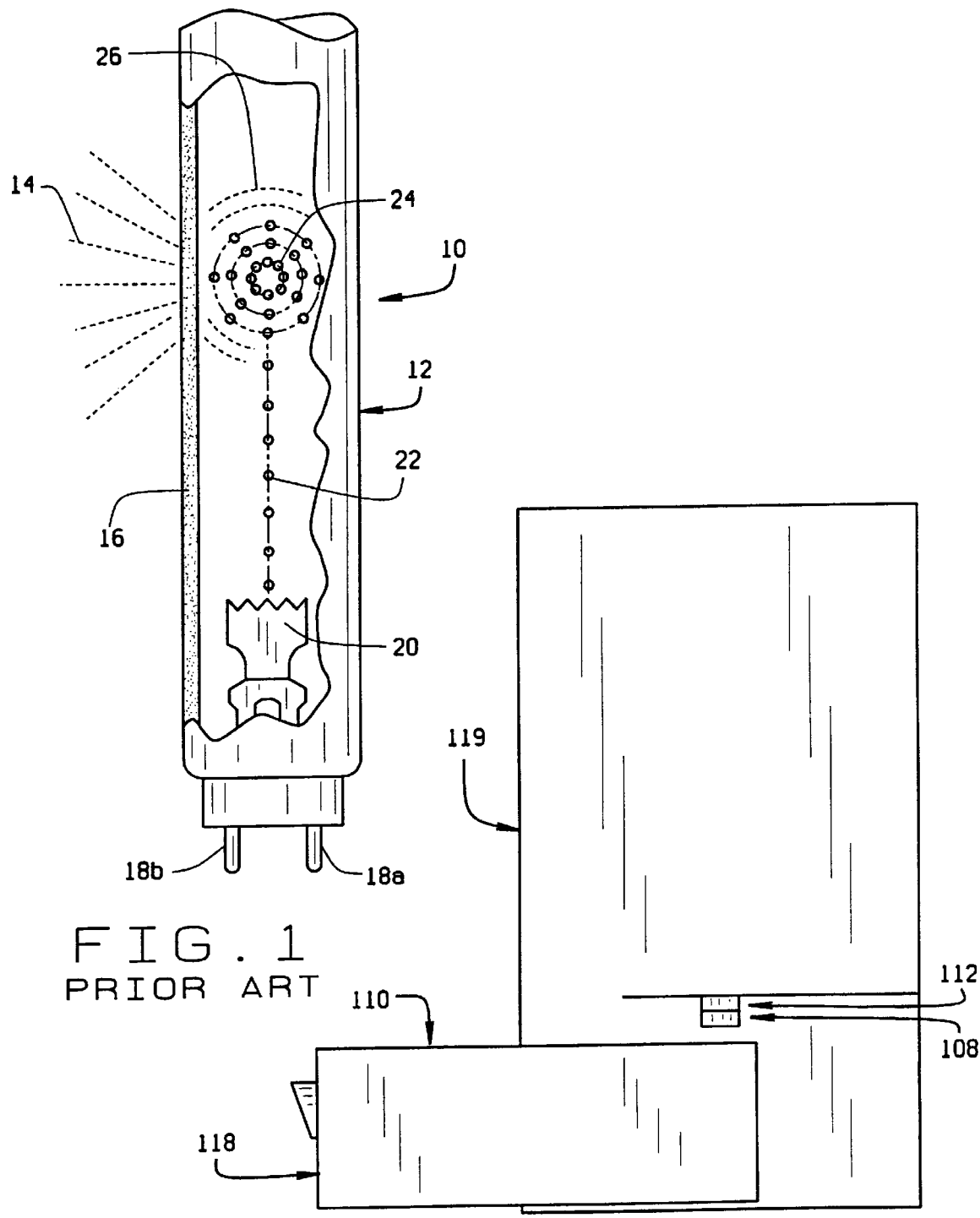
FIG. 1 is a cut-away illustration of a prior art florescent lamp.
FIG. 3 is a side sectional view of a refrigeration unit, illustration an alternate embodiment of the present invention adapted for use with a refrigerator pull-out drawer.

In an alternative embodiment, shown in FIG. 3, the enclosed compartment 102 is replaced by a refrigerator food drawer 118, often called a crisper drawer, seated in a refrigerator 119, and having an opening in place of upper surface 110. The ultraviolet lamp 108 and associated reflector cover 112 are secured to the underside of a refrigerator shelf immediately above the open upper surface 110 of the food drawer 118, such that ultraviolet radiation emitted by the ultraviolet lamp 108 is directed downward into the food drawer 118, and no radiation is directed upwards.

Figure 4:
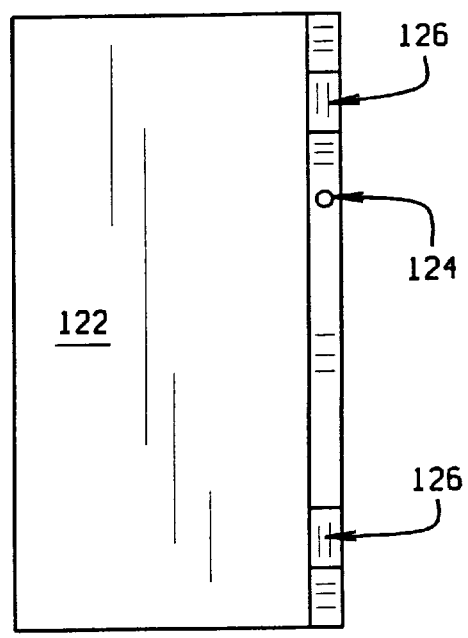
FIG. 4 is a view of a refrigerator door, illustrating the placement of a door-triggered switch relative to the door hinges.
Figure 5:
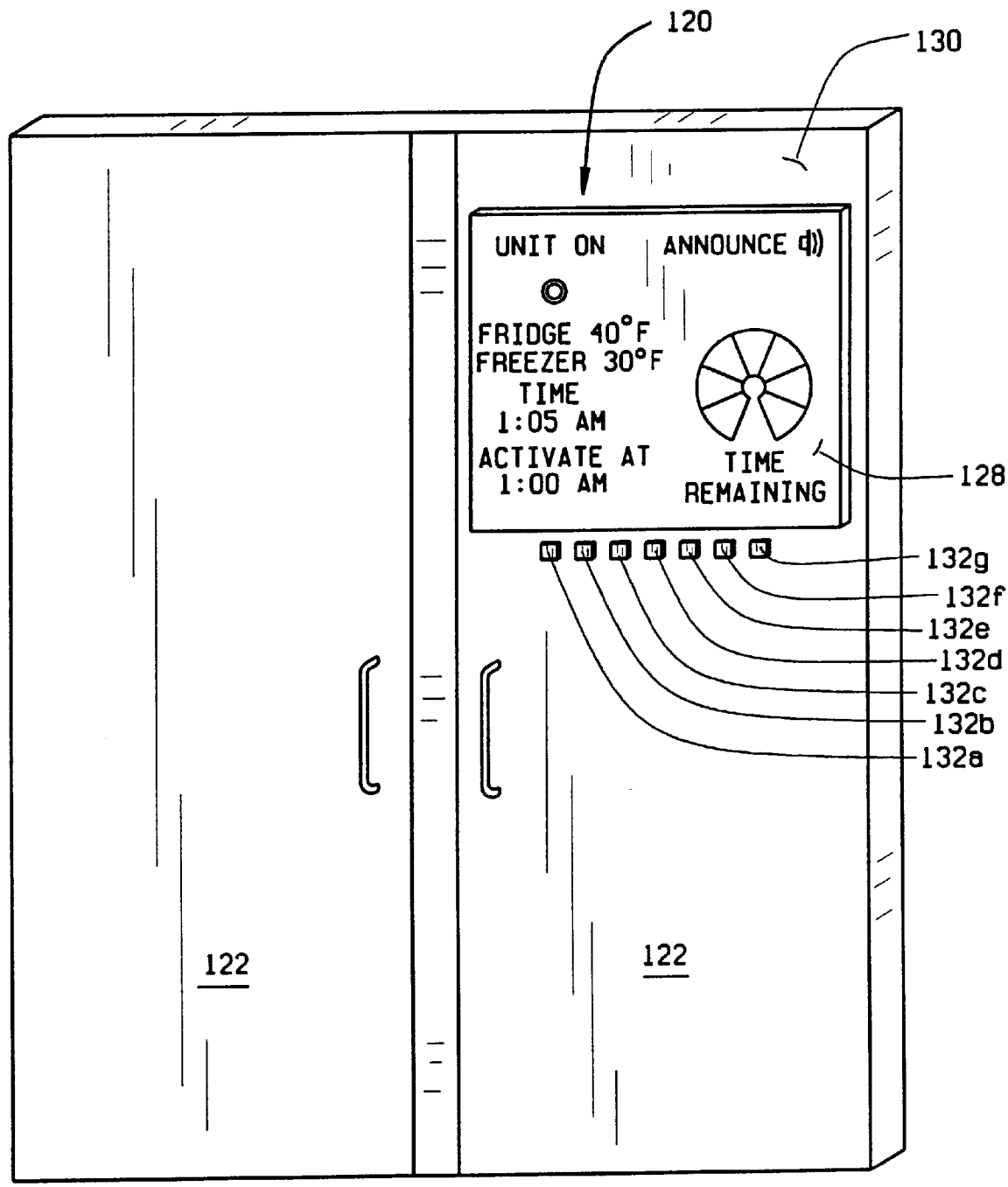
FIG. 5 is a front view of a refrigerator unit, illustrating the placement and layout of a preferred embodiment of a disinfecting unit display panel.

Turning to FIGS. 4 and 5, a control unit 120 for the food disinfecting unit 100 is shown in FIG. 5 installed in a door 122 of the refrigerator 119. Internal to the control unit 120 is a timer (not shown) which is responsive to the closure of a door switch 124. Door switch 124 is placed either in the refrigerator 119 or in the door 122, adjacent the door hinges 126, such that closure of the door 122 closes the door switch 124, permitting an electrical signal to be sent to the control unit 120. In the preferred embodiment, the door switch 124 is a momentary switch. Upon receiving a signal from the door switch 124 indicating closure of the refrigerator door 122, the timer in control unit 120 will wait for a predetermined period of time, preferably thirty seconds, and then activate the ultraviolet lamp 108 to irradiate either compartment 102 or drawer 118 with ultraviolet radiation. Prolonged exposure to radiation in the ultraviolet wavelengths emitted by ultraviolet lamp 108 may cause temporary, but painful, inflammation of the outer membranes of the human eye, as well as other histological problems. Accordingly, the delay in activation of the ultraviolet lamp 108 for a predetermined period of time after closure of the refrigerator door 122 is a safety feature designed to prevent an operator from receiving an accidental exposure to the ultraviolet radiation.

After closure of the refrigerator door 122 is detected by the control unit 120 (through door switch 124), and the predetermined period of time has elapsed, the timer activates the ultraviolet lamp 108 for a predetermined exposure period, preferably two minutes at an intensity of 500 angstroms. The predetermined exposure period is selected to destroy 90% of the various common micro-organisms found on food products and to reduce electrical usage by the unit while extending the operational lifetime of the ultraviolet lamp 108.

The control unit 120 further includes a display panel 128 on the outer surface 130 of refrigerator door 122 and a number of operator input means, shown in the preferred embodiment of FIG. 5 as seven buttons 132A–132G. The display panel 128 may be comprised of either a light emitting diode, liquid crystal, or gas plasma display, and is configured to provide the operator with an indication of proper operation of the food disinfecting unit 100 as well as the environmental conditions within the refrigerator 119. In the preferred embodiment shown in FIG. 5, the display panel 128 provides the operator with a visual count-down of time remaining during a disinfecting cycle, the start time of the cycle, the current time of day, refrigerator compartment temperatures, and a status light indicating that the disinfecting unit 100 is turned on. The buttons 132A–132G provide the operator with a means for controlling the operation of the disinfecting unit 100, and include in the preferred embodiment a start/stop button 132A, a time increment button 132B, a time decrement button 132C, a display on/off button 132D, a audio signal on/off button 132E, a clock on/off button 132F, an on/off button 132G. One skilled in the art will recognize that other input means may be employed within the scope of this invention with control unit 120 to adjust various operational parameters and displayed information.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. A food disinfecting system for use in a food storage refrigerator having a closeable door and at least one internal compartment, comprising:

a source of germicidal ultraviolet radiation disposed to emit said radiation within said internal compartment;

a layer of ultraviolet reflective material disposed on at least one surface of said internal compartment;

a control unit for activating said source of germicidal ultraviolet radiation; and a switch means disposed in said closeable door, said switch means activated upon closure of said door;

said control unit responsive to activation of said switch means to activate said source of germicidal ultraviolet radiation for a first predetermined period of time.

2. The food disinfecting system of claim 1 further including:
- a reflector means disposed adjacent said source of germicidal ultraviolet radiation, said reflector means configured to reflect ultraviolet radiation into said internal compartment; and
- an elevated food storage grill, said grill configured to germicidal ultraviolet radiation reflected from said ultraviolet reflective material to strike a lower surface of a food product stored on said grill.

3. The food disinfecting system of claim 1 wherein said control unit is further responsive to activation of said switch means to delay activation of said source of germicidal ultraviolet radiation for a second predetermined period of time.

4. The food disinfecting system of claim 3 wherein said control unit is configured to delay activation of said source of germicidal ultraviolet radiation for thirty seconds after activation of said switch means.

5. The food disinfecting system of claim 1 wherein said first predetermined period of time corresponds to a period of exposure to germicidal ultraviolet radiation sufficient to sterilize ninety percent of micro-organisms on a food surface.

6. The food disinfecting system of claim 5 wherein said first predetermined period of time is at least two minutes.

7. The food disinfecting system of claim 1 wherein said source of germicidal ultraviolet radiation is an ultraviolet lamp configured to emit radiation having wavelengths between 200 and 300 nanometers.

8. The food disinfecting system of claim 7 wherein said source of germicidal ultraviolet radiation is configured to emit radiation with an intensity of 500 angstroms.

9. The food disinfecting system of claim 1 wherein said control unit is further configured to de-activate said source of germicidal ultraviolet radiation upon de-activation of said switch, de-activation of said switch indicative of said closeable door being open.

10. The food disinfecting system of claim 1 wherein said internal compartment is a drawer, said source of germicidal ultraviolet radiation disposed adjacent an open side of said drawer.

11. The food disinfecting system of claim 1 further including a display panel communicatively interconnected to said control unit, said display panel providing at least one indication of an operating status of said source of germicidal ultraviolet radiation.

12. The food disinfecting system of claim 11 wherein said display panel includes a plurality of input means, said input means configured to facilitate operator control of said control unit.

13. The food disinfecting system of claim 11 wherein said display panel is a light emitting diode display.

14. The food disinfecting system of claim 11 wherein said display panel is a liquid crystal display.

15. The food disinfecting system of claim 11 wherein said display panel is a gas plasma display.

16. The food disinfecting system of claim 11 wherein said display panel is further configured to provide at least one indication of the environment within said food storage refrigerator.

17. The food disinfecting system of claim 11 wherein said indication of an operating system status of said source of germicidal ultraviolet radiation includes a count-down timer configured to display the time remaining until de-activation of said source of germicidal ultraviolet radiation by said control unit.

\* \* \* \* \*